UNITED STATES PATENT OFFICE.

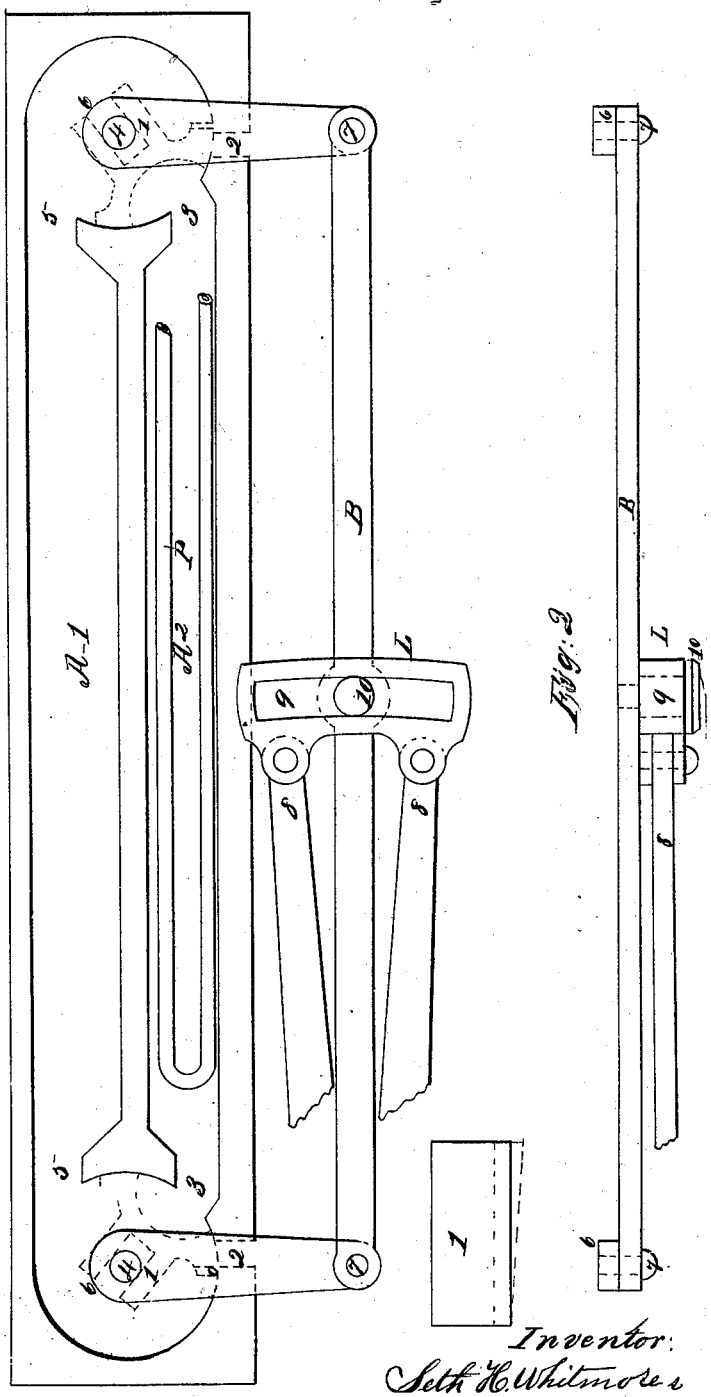

SETH H. WHITMORE, OF CINCINNATI, OHIO.

STEAM-ENGINE.

Specification of Letters Patent No. 31,920, dated April 2, 1861.

*To all whom it may concern:*

Be it known that I, SETH H. WHITMORE, of Cincinnati, Hamilton county, Ohio, have invented certain new and useful Improvements in Steam-Engines, of which the following is a full, clear, and exact description, reference being had to the accompanying drawings, in which like characters represent like parts of the engine.

My improvements relate, first, to the apparatus for admitting and shutting off steam and regulating the supply thereof in proportion to the wants of the engine; second, to the construction of the valve or valve openings as hereinafter described.

The first improvement consists of the combination of two hollow throated oscillating valves (placed at opposite ends of the steam cylinder) with each other, by means of a connecting rod attached to the valve cranks when the rod is operated by a link which receives its motion in the ordinary way.

In the drawings 1, 1, represent the hollow throated oscillating valves; 2, 2, the steam passages; 3, 3, the exhaust passages; 4, 4, the valve stems; 5, 5, the steam chamber; 6, 6, the valve cranks; 7, 7, the wrists at the extremity of the valve cranks, to which the connecting rod B is attached, thus connecting and combining the valves 1, 1; 8, 8, the rods which operate the link L, in the ordinary way, receiving their motion from separate eccentrics, or in any usual mode.

10, is the pin upon the rod B, upon which the link L moves by means of the slot 9. It is manifest that by moving the link up or down upon the pin 10, the leverage would be lengthened or shortened, and the valves would cut off earlier or later in the stroke. The position of the link upon the pin 10, and therefore in relation to the connecting rod B, may be varied by hand, or, the link may be brought directly under the control of the governor.

The second improvement, consists in providing the oscillating valves 1, 1, with a V-shaped opening, as shown at "2" in Fig. 3. This opening may be produced by giving a V shape, either to the valves 1, 1, or to the steam passages 2, 2. The object of such an opening is to prevent the cylinder from overcharging when the crank is passing its center, as one end or corner of the valve opening takes the steam, before the valve becomes fully opened throughout its entire length.

Having thus fully described my improvements; what I claim therein as new and desire to secure by Letters Patent, is:

1. The combination of two hollow throated oscillating valves with each other, when operated by a link motion, substantially as described.

2. The application of a governor to a link when used in combination with hollow throated oscillating valves, for the purpose of effecting a variable cut-off, substantially as described.

3. The V-shaped opening in the valve or valve seat of a hollow throated oscillating valve, for the purpose of admitting steam before the valve is opened throughout its entire length, substantially as described.

In testimony whereof I have hereunto set my hand.

SETH H. WHITMORE.

Witnesses:
SAML. S. FISHER,
WM. T. RICHARDSON.